(12) United States Patent
Hansen et al.

(10) Patent No.: US 10,036,367 B2
(45) Date of Patent: Jul. 31, 2018

(54) METHOD FOR CONTROLLING THE PITCH ANGLE OF AT LEAST ONE WIND TURBINE BLADE

(71) Applicant: ROMO Wind AG, Zug (CH)

(72) Inventors: Jesper Kjær Hansen, Ebeltoft (DK); Jørgen Højstrup, Mårslet (DK)

(73) Assignee: ROMO Wind AG, Zug (CH)

( * ) Notice: Subject to any disclaimer, the term of this patent is extended or adjusted under 35 U.S.C. 154(b) by 348 days.

(21) Appl. No.: 14/399,683

(22) PCT Filed: May 13, 2013

(86) PCT No.: PCT/EP2013/059800
§ 371 (c)(1),
(2) Date: Nov. 7, 2014

(87) PCT Pub. No.: WO2013/171154
PCT Pub. Date: Nov. 21, 2013

(65) Prior Publication Data
US 2015/0139796 A1    May 21, 2015

(30) Foreign Application Priority Data
May 18, 2012   (EP) .................................... 12168478

(51) Int. Cl.
*F03D 7/02*    (2006.01)
*F03D 17/00*   (2016.01)
*F03D 7/04*    (2006.01)

(52) U.S. Cl.
CPC .......... *F03D 7/0224* (2013.01); *F03D 7/0268* (2013.01); *F03D 7/047* (2013.01);
(Continued)

(58) Field of Classification Search
CPC ........ F03D 7/04; F03D 7/0264; F03D 7/0224; F03D 7/043; F05B 2270/3201; F05B 2270/322
See application file for complete search history.

(56) References Cited

U.S. PATENT DOCUMENTS 7,347,668 B2 *  3/2008  Pedersen ............... F03D 7/0204
                                                416/1
7,964,979 B2 *  6/2011  Miranda ............... F03D 7/0224
                                                290/44
(Continued)

FOREIGN PATENT DOCUMENTS

| EP | 2025929 A2 | 2/2009 |
| EP | 2112373 A2 | 10/2009 |
| GB | 2476507 A | 6/2011 |

OTHER PUBLICATIONS

Purdue College of Engineering, ME365, Chapter 8 Spectrum Analysis, PDF.*
(Continued)

*Primary Examiner* — Richard Edgar
*Assistant Examiner* — John S Hunter
(74) *Attorney, Agent, or Firm* — Dinsmore & Shohl LLP

(57) ABSTRACT

The invention regards a method for controlling the pitch angle of at least one wind turbine blade in a rotor connected to a main shaft on a wind turbine, the method comprises the steps of determining; a first component of the wind vector which is upwind, horizontal and aligned with the main shaft direction and, a second component of the wind vector which is upwind, perpendicular to the first component of the wind vector, wherein the first component of the wind vector and the second component of the wind vector are determined by use of at least one ultrasonic sensor mounted on the rotor, (Continued)

whereby the pitch angle is controlled based on the first component of the wind vector and the second component of the wind vector.

9 Claims, 3 Drawing Sheets

(52) U.S. Cl.
CPC .......... *F03D 17/00* (2016.05); *F05B 2270/32* (2013.01); *F05B 2270/404* (2013.01); *Y02E 10/721* (2013.01); *Y02E 10/723* (2013.01)

(56) References Cited

U.S. PATENT DOCUMENTS

| | | | |
|---|---|---|---|
| 8,232,801 B2* | 7/2012 | Tralshawala | G01R 33/441 |
| | | | 324/310 |
| 8,907,511 B2* | 12/2014 | Bowyer | F03D 7/028 |
| | | | 290/44 |
| 2009/0047116 A1* | 2/2009 | Barbu | F03D 1/008 |
| | | | 415/1 |
| 2012/0128488 A1* | 5/2012 | Kristoffersen | F03D 7/0224 |
| | | | 416/31 |

OTHER PUBLICATIONS

StackExchange, Why is the Fourier transform so important?, 2011, PDF.*

International preliminary Report on Patentability for PCT/EP2013/059800 dated Nov. 18, 2014.

\* cited by examiner

METHOD FOR CONTROLLING THE PITCH ANGLE OF AT LEAST ONE WIND TURBINE BLADE

CROSS-REFERENCE TO RELATED APPLICATIONS

This application is the U.S. National Phase of PCT/EP2013/059800 filed May 13, 2013, which claims priority of European Patent Application 12168478.1 filed May 18, 2012.

FIELD OF INVENTION

The invention relates to a method and apparatus for controlling the pitch angle of at least one wind turbine blade in a rotor on a wind turbine.

BACKGROUND OF THE INVENTION

In a wind turbine it is essential to control the pitch angle of the blades. A conventional wind turbine has a rotor, comprising a number of blades, usually three blades, and a spinner. In some turbine models, the so-called pitch regulated turbines, the pitch angle of these blades can be adjusted mechanically and dynamically by a pitch mechanism depending on the actual wind conditions. In operation, the control system of the wind turbine will adjust or control the pitch angle of the blades to ensure optimum performance of the wind turbine. This is to keep the rotational speed of the rotor within operating limits and to minimise wear of the wind turbine. Under certain circumstances, such as high or low wind speeds, the wind turbine can be taken out of service either by completely stopping the rotor or at least ensure a slow revolution speed of the rotor. This can be done by adjusting/controlling the pitch angle of the blade so that the angle of attack of the blades is diverted from the wind.

The known pitch-regulated wind turbines have a control system, which controls the pitch of the blades. This system bases control of the pitch angle on the measured wind speed by the turbine wind sensors. An anemometer placed on the nacelle, behind the rotor is an example of a frequent method used for measuring the wind speed. This position of the wind sensors is, however, far from ideal, as the wind vane will measure the wind after it has passed the rotor, when the wind turbine is in operation. The measurements are therefore heavily influenced by the turbulence generated by the rotor as well as by other aerodynamic effects caused by the nacelle. In addition, buildings, trees, and neighbouring wind turbines will significantly influence the wind speed-readings. This means, that the wind vane will transfer incorrect information to the wind turbine control system. The presently used nacelle anemometers are furthermore not capable of detecting potential damaging wind phenomena such as wind shear and potentially damaging wind inclination angles. This is a disadvantage as it is desirable to have as reliable information of the wind speed, wind shear and the wind inclination angle of the rotor as possible.

Further, if the wind turbine has more than one blade, conventionally it has three blades, the blade pitch of the blades can be controlled independently of each other.

Further, it is known to use a LiDAR to establish the wind speed upwind of the wind turbine and use that information to control the wind turbine. EP 0 970 308 disclose a wind turbine with a laser anemometer system, such as a LiDAR, it is used to determine the air velocity in front of the wind turbine. In addition, it is disclosed that the determined air velocity in front of the wind turbine can be used to control the pitch of the wind turbine blades.

An example of a LiDAR controlled wind turbine is disclosed in EP 2 025 929 A2. It describes a method for controlling the pitching of the blades based on measurements from a LiDAR. The LiDAR is mounted on the wind turbine hub and configured to measure components of the wind velocity within a predetermined portion of a planar field in front of the hub.

When using a LiDAR as disclosed in the above mentioned documents the wind velocity is measured at a substantial distance in front of the wind turbine, at least 20 meters. However, the wind direction and velocity will change within this distance; consequently the components of the wind velocity measured by a LiDAR will be different than the components of the wind velocity that actually attack the blades. Consequently, the blades are not pitched optimally.

Further, if it is raining or snowing the LiDAR cannot measure the wind velocity, because the laser ray gets blocked and/or disrupted by the rain drops or snowflakes in such a way, that no reliable information can be retrieved. When no information can be retrieved the blade cannot be pitched correctly.

SUMMARY OF THE INVENTION

Considering the prior art described above, it is an object of the present invention to provide a method and apparatus for controlling the pitch angle, based on reliable data obtained by measuring the wind.

The object can be achieved by means of a method for controlling the pitch angle of at least one wind turbine blade in a rotor connected to a main shaft on a wind turbine, the method comprises the steps of determining: a first component of the wind vector which is upwind, horizontal and aligned with the main shaft direction and a second component of the wind vector which is upwind and perpendicular to the first component of the wind vector, wherein the first component of the wind vector and the second component of the wind vector are determined by use of at least one ultrasonic sensor mounted on the rotor, whereby the pitch angle is controlled, based on the first component of the wind vector and the second component of the wind vector.

By use of the presented method the blades can be pitched optimally for the actual wind attacking the blades and in all weather conditions.

An ultrasonic sensor can comprise two transducers where between a ultrasonic signal is transmitted, by measuring the travel time for the ultrasonic signal and knowing the distance between the transducers it is possible to determine the wind speed.

Upwind should be understood as the wind in front of the wind turbine, the wind flows upwind in relation to the wind turbine is substantially unaltered by the wind turbine. By using the wind upwind/in front of the wind turbine, it is possible to ensure that the blades can be controlled optimally.

The skilled person will recognise that the main shaft of a wind turbine can be tilted, in order to ensure that the blades do not hit the wind turbine tower. Therefore, horizontal and aligned with the main shaft direction, should be understood as substantially horizontal and substantially aligned with the main shaft direction. It can also be interpreted as the direction perpendicular to the plane, defined by the rotor blades.

The wind vector is to be understood as the wind speed vector which is the vector describing the wind speed. In an example, the first component of the wind vector is understood as the x-component and the second component of the wind vector is a vector in the plane defined by the y-component and the z-component.

The first and second component of the wind vector can be determined by a spinner anemometer as disclosed in EP 1733241 B1, which is incorporated by reference in its entirety. The spinner anemometer can have at least one sensor fixed to the rotor of the wind turbine and an angular sensor, which can determine angular position of the rotor. A circuit is then able to convert the relationship between the output of the at least one sensor and the output of the angular sensor into the speed and direction of the wind, experienced by the wind turbine. In other words, the spinner anemometer can determine the wind speed in three dimensions directly in front of the rotor plane.

Determining can be measuring, however, it is to be understood that when measuring the output from the at least one sensor, the output needs to be processed in order to determine the components of the wind vector.

The spinner anemometer has several advantages over the use of LiDARs, as LiDARs cannot determine the wind shear and wind inclination angle, whereas the spinner anemometer can determine both. In addition, LiDARs have a plurality of other disadvantages. LiDARs are delicate instruments, which are non-resistant towards vibrations. They use lasers and they cannot be operated in rain, sleet and snow or any other precipitation, as it will obstruct the laser beam. Further, the laser is not able to operate if there are no particles suspended in the air as no backscatter can be generated. These disadvantages are overcome by using a spinner anemometer. Also the price for a LiDAR is relatively high compared to the spinner anemometer and the accompanying software and consequently hardware requirements are substantially larger for an operational LiDAR compared to a spinner anemometer.

Preferably, the method further comprises the steps of determining a third component of the wind vector, which is upwind and perpendicular to the first component of the wind vector and the second component of the wind vector, whereby the pitch angle is further controlled, based on the third component of the wind vector. With use of a third component, the full three dimensional wind vector can be taken into account when controlling the pitch angle.

In an embodiment, the first and the second component of the wind vector are determined by use of at least one ultrasonic sensor positioned upwind. Such a sensor can be a sensor, which is part of a spinner anemometer as mentioned above. Up wind should be understood as mentioned above, for example a sensor that is positioned upwind can be positioned on the spinner or the blades on the side that faces upwind. In other words, up wind can be understood as in front of the plane defined by the blades.

In an embodiment, the pitch angle is controlled based on the average of the first component of the wind vector and/or the average of the second component of the wind vector, preferably the average is over a period of 1, 5, 10, 15 or 20 minutes. Depending on the second component of the wind vector; the average of the first and the second component can give the yaw error of the wind turbine or the wind inclination angle. If the wind turbine rotor is not properly aligned, the wind turbine has a yaw error—the wind is angled to a side. The wind inclination angle tells if the wind comes at an angle above or below the horizontal and substantially aligned with the main shaft direction. In other words the wind inclination angle and/or the yaw error, for example measured by a spinner anemometer, can then be used as a control parameter for the pitch control of the wind turbine blades.

Preferably, the pitch angle is controlled based on the turbulence of the first component of the wind vector, and/or the turbulence of the second component of the wind vector. Turbulence in one dimension is the fluctuation of the velocity in that dimension. A component of the wind vector (the wind velocity), for example the x-component, can be described by use of a mean value and a velocity fluctuation in the following way; $v_x = \overline{v_x} + v'_x$. Where $\overline{v_x}$ is the mean value of the wind velocity in the x direction and $v'_x$ is the fluctuation of the wind velocity in the x direction. The turbulence is equal to the fluctuation of the wind velocity. Thus, the turbulence of the first component of the wind vector can be understood as $v'_x$. By using the real-time measurement of the turbulence, preferably measured by a spinner anemometer, the wind turbine can be put into a load reduction mode when the turbulence exceeds a predefined value. The load reduction mode can be pitching the blades in order to reduce the load. When regulating based on the turbulence, it is ensured to only reduce power output of the wind turbine when it is necessary, thereby increasing the average energy output and eliminating the need for programming the controller of the wind turbines individually to take care of the critical sectors, also eliminating the need for an accurate measurement of the nacelle position, which is problematic for many turbine model.

In an embodiment, the pitch angle is controlled based on sudden changes of the first component of the wind vector and/or sudden changes of the second component of the wind vector, wherein sudden changes are changes in the wind vector by more than 50% over a time scale of 3 seconds and/or changes of more than 7 m/s over a timescale of one minute. Sudden changes in the wind are often associated with very high gust levels. Controlling the pitch, based on sudden changes in the wind, enables the wind turbine controller to take appropriate actions to avoid damaging loads to the wind turbine. This could be pitching the blades, which in some cases can bring the rotor to a stop.

Preferably, the pitch angle is controlled based on the spectral decomposition of the correlation between the first component of the wind vector and the second component of the wind vector, preferably the correlation between the first component of the wind vector and the second component of the wind vector constitutes a wind shear measurement. By spectral decomposition of the correlation of the first component of the wind vector and the second component of the wind vector and preferably also the correlation of the first component of the wind vector and the third component of the wind vector, reliable information of the wind shear relating to different separations can be obtained. Consequently, the control of the blade pitch can be improved, for example via load reduction and/or power output optimisation. This can be done by decomposing the wind vector in to three components, $vx=vx+v'x$, $vy=vy+v'y$, $vz=vz+v'z$ Where vx, vy, vz, is the mean value of the wind velocity in the x,y,z direction, respectively and v'x, v'y, v'z is the fluctuation of the wind velocity in the x,y,z direction, respectively. The first component of the wind vector can be vx, the second component of the wind vector can be vz and the third component of the wind vector can be vy. Now a coordinate system can be chosen where vy and vz are zero and only vx has a non-zero value. If this is done the correlation between v'x and v'z can be determined. If it is large there is a large wind gradient in the xz-plane and if it is small the vind gradient in the xz-plane is small. If vx is the wind speed horizontally and aligned with the main shaft direction and vz is the vertical wind speed; then the correlation v'x and v'z gives a measure on the size of the wind shear. The wind shear can then be determined from the spectral decomposition of the correlation v'x and v'z in the following way: A scale l can be chosen which can be the equal to the diameter of the rotor, for example 100 meters. This scale can be converted to a frequency f by using Taylors' hypothesis of frozen turbulence in the following way; f=vx/l. A band-pass filter centred around f can then be used to filter the correlation of v'x and v'z, whereby the variance var(BP) of the signal can be determined. Lastly, the wind shear across the height distance/can be determined as (dvz)/dt=C√{square root over (var(BPD))}/l. The constant C depends on the bandwidth of the filter and can be experimentally determined. In similar fashion the wind gradient can be determined in any desired plane.

Advantageously, the pitch angle is controlled in such a way that the rotor is brought to a stop if the determined first component of the wind vector and/or the determined second component of the wind vector exceeds or falls below predefined values. A wind turbine can pitch the blades in order to stop rotation of the rotor in predefined wind conditions, such as when the wind speed exceed or fall below a predefined operation value, for example; wind speed, wind inclination angle, turbulence, sudden changes in the wind and/or wind shear. This is done to minimise wear and hinder damaging the wind turbine combined with optimisation of the power output of the wind turbine.

Preferably, the first component of the wind vector and the second component of the wind vector are determined less than 40 meters upwind of the rotor, preferably less than 10 meters, preferably less than 1 meters. It is preferred to determine, preferably measure, the wind vector as close to the rotor as possible; the father away from the rotor the wind is determined, the larger the probability is that major changes in has taken place before it reaches the blades on the rotor. This is especially important when measuring turbulence, the wind inclination angle and the wind shear, as they wary, depending on the ground conditions or other obstacles for the wind. For example, if a wind turbine is in the wake from another wind turbine, the turbulence, wind inclination angle and the wind shear can change significantly over an interval of a less than 10 meters. Measuring the first component of the wind vector and the second component of the wind vector, can be done by use of a spinner anemometer as described above.

A LiDAR determines the wind conditions at a considerable distance in front of the wind turbine, at least 10 meters. This is believed to be advantageously as it gives a time delay to configure the wind turbine to the coming wind conditions. However, the wind conditions can change substantially over 50 meters which result in a wind turbine that is far from optimally controlled; with blade pitched at a non-optimum angle.

In order to overcome this disadvantage a spinner anemometer can be used. Here components of the wind vector are determined less than 1 meters in front of the rotor. The pitch angle can thus be adjusted depending, among other things, on the wind vector that actually hits the blades. The disadvantage, compared to a LiDAR is that there is no time delay where the pitch can be adjusted for the coming wind. However, by using a spinner anemometer the wind turbine can be adjusted to the actual load that hits the wind turbine, which is an advantage compared to a wind turbine controlled at least partly by a LiDAR.

Advantageously, the first component of the wind vector is determined by one, two or three sensors and/or the second component of the wind vector is determined by one, two or three sensors. This makes it easier to determine the first component of the wind vector and the second component of the wind vector. Further, if a sensor malfunctions, operation of the wind turbine can continue with the remaining sensors.

The invention also concern an apparatus for controlling the pitch angle of at least one wind turbine blade in a rotor, connected to a main shaft on a wind turbine, comprising, at least one ultrasonic sensor mounted on the rotor and adapted to determine, a first component of the wind vector, which is upwind, horizontal and aligned with the main shaft direction and a second component of the wind vector which is upwind, perpendicular to the first component of the wind vector and means for controlling the pitch angle based on the first component of the wind vector and the second component of the wind vector.

In a preferred embodiment, a spinner apparatus comprise a spinner anemometer as mentioned above. The spinner anemometer can be adapted to determine the first component of the wind vector and the second component of the wind vector.

Advantageously, the at least one ultrasonic sensor is further adapted to determine, a third component of the wind vector which is upwind and perpendicular to the first component of the wind vector and the second component of the wind vector wherein the means for controlling the pitch angle is further based on the third component of the wind vector.

It is to be understood, that the apparatus can be adapted to perform any of the methods disclosed above.

The invention can also be regarded as a wind turbine comprising an apparatus as mentioned above and/or performing any of the above mentioned methods.

DESCRIPTION OF THE DRAWINGS

The invention will in the following be described in greater detail with reference to the accompanying drawings.

DETAILED DESCRIPTION OF THE INVENTION

Figure 1:
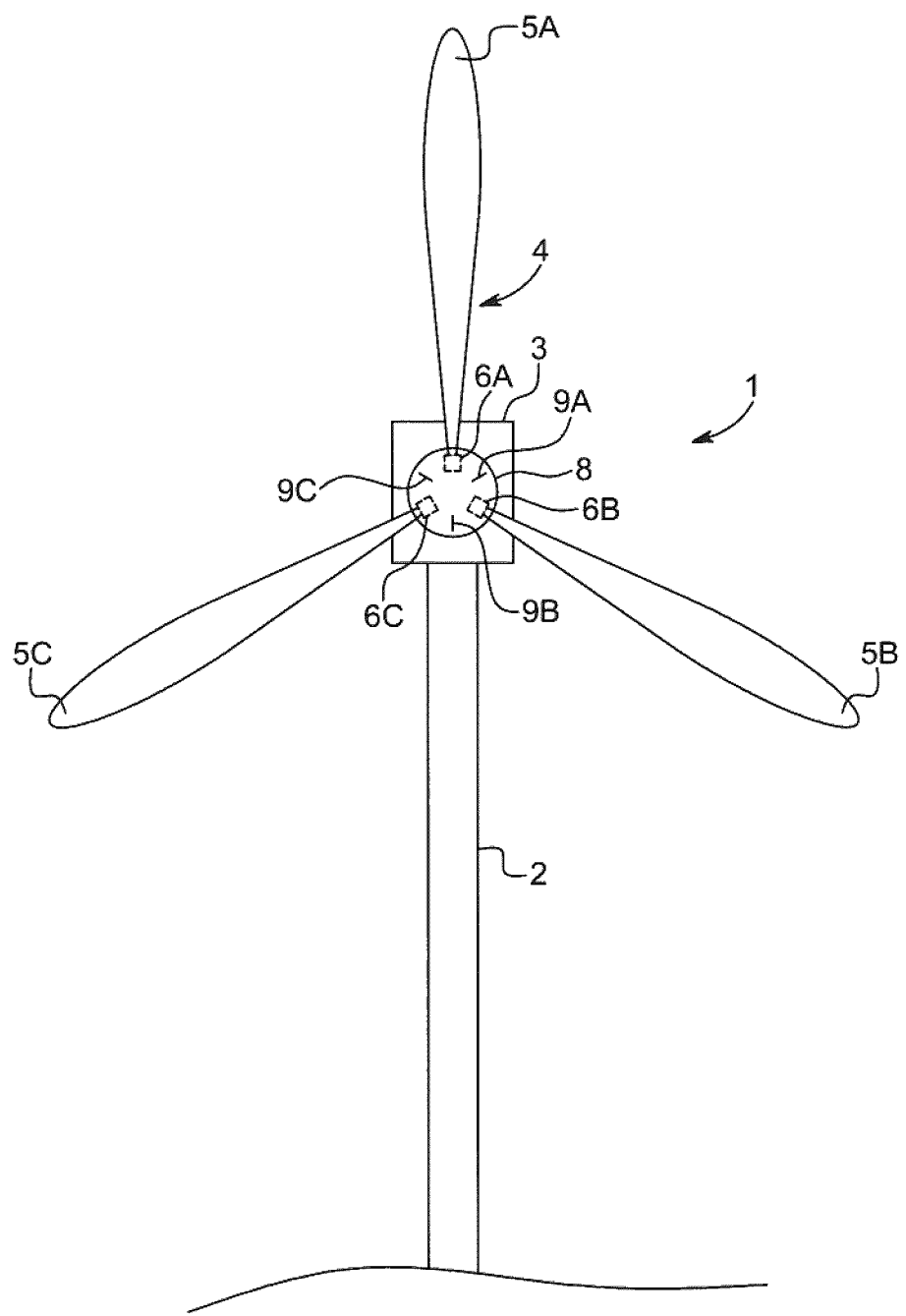
FIG. 1 a schematic view of a wind turbine with blades controlled by an embodiment of the invention.

FIG. 1 shows a wind turbine 1 having a tower 2 and a nacelle 3. On the nacelle 3 a rotor 4 is mounted. The rotor 4 has three blades 5A, 5B, 5C connected to a hub whereon a spinner 8 is mounted in order to streamline the flow around the hub. The hub is located inside the spinner and is not shown in the figs. The hub is connected to the main shaft (not shown). The main shaft is angled upwards by a few degrees in relation to horizontal; order to ensure that the blades 5A, 5B, 5C don't get in contact with the tower 2.

The pitch of the blades 5A, 5B, 5C is controlled by pitch drives 6A, 6B, 6C respectively. The pitch drives 6A, 6B, 6C are situated inside the spinner and connects the blades with the hub, which is connected to the main shaft, in such a way that the blades 5A, 5B, 5C can be rotated. The pitch drives 6A, 6B, 6C are connected with the wind turbine control 7, which collects data from sensors on the wind turbine 1. The wind turbine control 7 determines the control parameters for operation of the blade pitch of the wind turbine blades 5A, 5B, 5C. In one embodiment, the wind turbine control 7 additionally controls other parameters for the control of the wind turbine 1. In another embodiment; the wind turbine 1 has a plurality of control units, which control different parts of the wind turbine operation.

A spinner anemometer is attached on the wind turbine 1, an example of a spinner anemometer is disclosed in EP 1 733 241. Below is a short description of a spinner anemometer.

On the spinner 8 three ultrasonic air speed sensors 9A, 9B, 9C are mounted. They are mounted in such a way, that the wind measurements are made above the boundary layer of the spinner. It is noted, that in the present embodiment three sensors are used, however, it is also possible to use one or two or any number of-sensors. When determining components of the wind vector by use of the ultrasonic sensors 9A, 9B, 9C the measurements must be compensated by the rotation of the spinner.

The wind turbine 1 further comprise an angular sensor (not shown), which can measure the angular position of the rotor and a circuit 10, that can convert the relationship between the outputs of the ultrasonic sensors 9A, 9B, 9C and the angular sensor, into the speed and direction of the wind experienced by the wind turbine 1. In other words, it can determine components of the wind vector e.g. a first component of the wind vector which is upwind, horizontal and aligned with the main shaft direction, a second component of the wind vector which is upwind, perpendicular to the first component of the wind vector and, a third component of the wind vector which is upwind and perpendicular to the first component of the wind vector and the second component of the wind vector.

The spinner 8 has the form of a sphere in the relevant area and consequently the circuit 10 can use that knowledge to determine how the air flows around it. This knowledge is combined with the position of the ultrasonic sensors 9A, 9B, 9C as their rotation makes it possible to determine the wind in any desired direction.

By use of the described spinner anemometer, it is possible to determine the wind in all three dimensions. Thus, the full wind vector can be determined and consequently wind shear, turbulence, sudden changes in the wind, yaw error and the wind inclination angle can be determined.

It is noted, that the present invention, opposed to the previous pitch controls, which to some extent, are partly based on measurements that either gives an inaccurate value of the wind conditions or is modified by a mathematical model in order to compensate for the known inaccuracies. In both examples the determined wind conditions are not accurate, at least not in all operation conditions.

It is also noted, that the wind conditions upwind of the rotor can change over a few meters if for example the wind turbine 1 is positioned near or on a hill or changes in the landscape and will also be effected by other wind turbines or trees in the vicinity. It is therefore preferred to determine the wind conditions as close to the rotor as possible so the wind is not altered before it hits the blades 5A, 5B, 5C.

Figure 2:
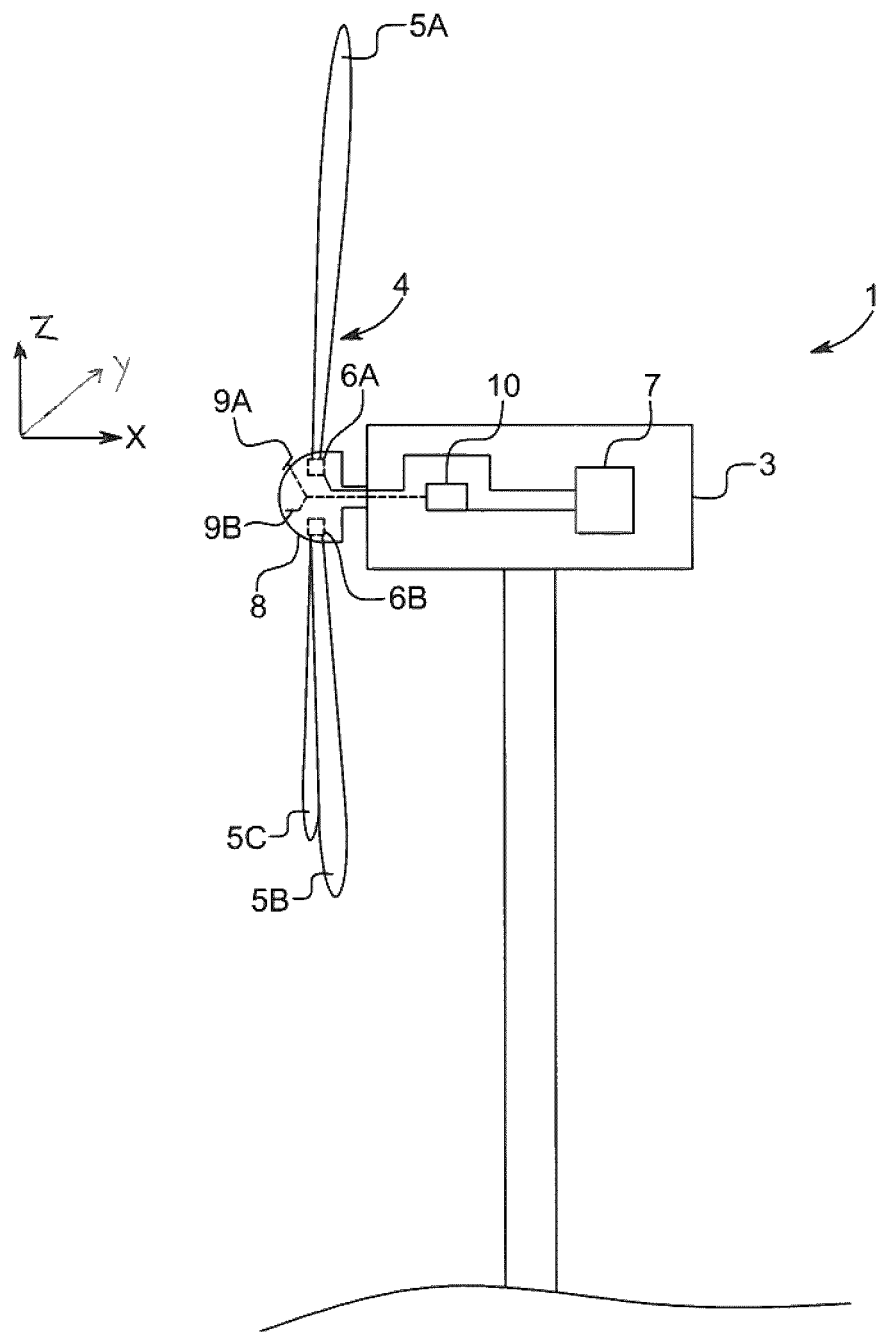
FIG. 2 a schematic view of a wind turbine with blades controlled by an embodiment of the invention.

In FIG. 2 a cartesian coordinate system is shown, the x-axis is horizontal and aligned with the main shaft direction of the turbine and can therefore be understood to be the direction of the first component of the wind vector. The z-axis is vertical and perpendicular to the x-axis. The y-axis is horizontal and perpendicular to the x and z-axes. The second component of the wind vector can be taken to lie in the plane defined by the y and z-axis. In an example, the second component of the wind vector is in the direction of the z-axis. The third component of the wind vector is perpendicular to both the first and the second component of the wind vector and can therefore be understood to lie in the plane defined by the y and z-axis. In an example the third component of the wind vector is in the direction of the y-axis.

Figure 3:
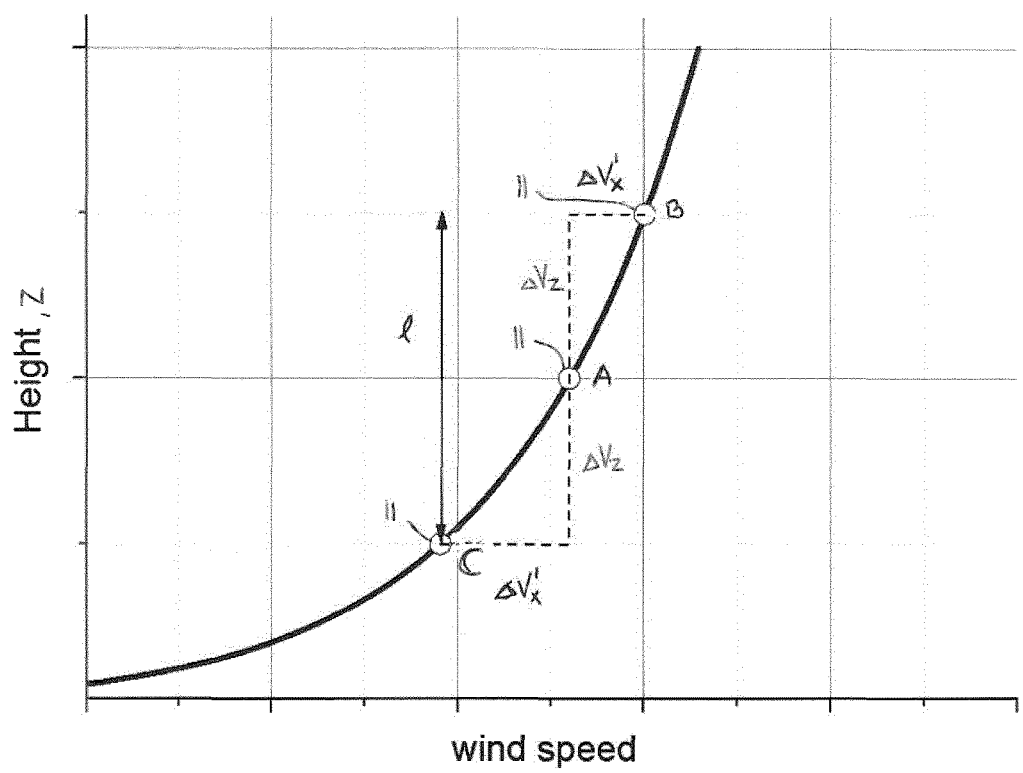
FIG. 3 is a graph showing the wind shear.

The wind shear can be determined by the spectral decomposition of the correlation between the measurement of the x component of the wind vector and the z component of the wind vector. The wind vector is decomposed (Reynolds decomposition) into three components. $v_x = \overline{v}_x + v'_x$, $v_y = v'_y$, $v_z = v'_z$, where $v'_x$, $v'_y$, $v'_z$ have an average value of zero. FIG. 3 shows a graph of the wind shear. In order to determine the wind shear over the scale/the vertical fluctuation of an air particle 11 is considered. When the vertical fluctuation is positive, and the air particle moves from A to B, which gives a negative contribution to $v'_x$. In the opposite way; when the vertical fluctuation is negative and the air particle moves from A to C, there is a positive contribution to $v'_x$. Consequently, the correlation $corr(v'_x, v'_z)$ will be negative and large if the wind gradient is large and small if the wind gradient is small. The contribution to $corr(v'_x, v'_z)$ from the scale/can be determined by converting the scale l to a frequency by use of Taylor's hypothesis of frozen turbulence, in the following way, $f = \overline{v}_x/l$. A band-pass filter can then be adapted to filter the $corr(v'_x, v'_z)$ signal centred around the frequency f. The variance, var(BP), of that signal can then be determined. The wind shear across the height/can be determined by use of the formula $(dv_z)/dt = C\sqrt{var(BP)}/l$. The constant C can be determined experimentally.

REFERENCE LIST 1 wind turbine
2 tower
3 nacelle
4 rotor
5 blades
6 pitch drives
7 wind turbine control
8 spinner
9 ultrasonic sonic air speed sensors
10 circuit
11 air particle

The invention claimed is:

1. A method for controlling a pitch angle of at least one wind turbine blade in a rotor connected to a main shaft on a wind turbine, the method comprising the steps of:
   providing ultrasonic sensors mounted on the rotor;
   measuring:
      a first component of a wind vector which is upwind, horizontal and aligned with the main shaft direction using at least one of the ultrasonic sensors;
      a second component of the wind vector which is upwind, and perpendicular to the first component of the wind vector using at least one of the ultrasonic sensors;
      a third component of the wind vector which is upwind and perpendicular to the first component of the wind vector and the second component of the wind vector;
   determining a respective average of each of the first and second components of the wind vector over time;
   determining a turbulence of the first component of the wind vector based on the measured first component of the wind vector, and/or turbulence of the second component of the wind vector based on the measured second component of the wind vector;

providing a correlation corresponding to a component of a wind shear across a distance, the correlation being determined by:
  determining a spectral decomposition of the turbulence of the first component and a spectral decomposition of the turbulence of the second component;
  determining a frequency window for the spectral decomposition; and
  determining the correlation between the turbulence of the first component and the turbulence of the second component based on the spectral decomposition of the turbulence of the first component and the spectral decomposition of the turbulence of the second component within the frequency window;
determining the component of the wind shear across the distance by using the correlation, and
controlling the pitch angle based on:
  the average of the first component of the wind vector and the average of the second component of the wind vector and the third component of the wind vector;
  the turbulence of the first component of the wind vector and/or the turbulence of the second component of the wind vector; and
  the component of the wind shear.

2. The method according to claim 1, wherein the pitch angle is controlled, based on sudden changes in of first component of the wind vector and/or sudden changes in the second component of the wind vector, wherein said sudden changes are changes in the wind vector by more than 50% over a time scale of 3 seconds and/or changes of more than 7 m/s over a timescale of one minute.

3. The method according to claim 1, wherein the pitch angle is controlled, based on a second component of the wind shear determined by a spectral decomposition of the correlation between the first component of the wind vector and the third component of the wind vector.

4. The method according to claim 1, wherein the pitch angle is controlled in such a way, that the rotor is brought to a stop if the first component of the wind vector and/or the second component of the wind vector exceeds or falls below predefined values.

5. The method according to claim 1, wherein the first component of the wind vector and the second component of the wind vector are determined less than 40 meters upwind of the rotor.

6. The method according to claim 1, wherein the first component of the wind vector is determined by one, two or three ultrasonic sensors and/or the second component of the wind vector is determined by one, two or three ultrasonic sensors.

7. The method according to claim 1, wherein determining the correlation further includes determining a center frequency and wherein the frequency window is determined based on the center frequency.

8. The method according to claim 1, wherein determining the component of the wind shear across the distance using the correlation includes:
  determining a variance of the correlation signal; and
  determining the component of the wind shear based on the variance and the distance.

9. The method according to claim 8, wherein the variance of the correlation signal is determined using a band-pass filter.

* * * * *